United States Patent [19]

Libby

[11] 3,808,369

[45] Apr. 30, 1974

[54] ATTENUATION EQUALIZING ACOUSTIC COUPLER

[75] Inventor: Ross C. Libby, West Jefferson, Ohio

[73] Assignee: MI2, Inc., Columbus, Ohio

[22] Filed: June 16, 1972

[21] Appl. No.: 263,555

[52] U.S. Cl. .......... 179/1 C

[51] Int. Cl. .......... H04m 1/00

[58] Field of Search .......... 179/1 C, 2 C, 6 AC, 1 D, 179/2 DP, 2 TV; 333/2, 8 T

[56] References Cited

UNITED STATES PATENTS

| | | | |
|---|---|---|---|
| 3,449,522 | 6/1969 | Crane | 179/1 C |
| 3,624,298 | 11/1971 | Davis | 179/1 D |
| 3,657,479 | 4/1972 | Sweenie | 179/1 C |
| 3,536,840 | 10/1970 | Sullivan | 179/2 DP |
| 3,524,023 | 8/1970 | Whang | 179/2 DP |

OTHER PUBLICATIONS

IBM Technical Disclosure Bull., Levin, Band Switching an Active Filter, 8/1970.

Design Elements, Inc. Couplers, Copyright 1971.

*Primary Examiner*—Thomas W. Brown
*Assistant Examiner*—Jon Bradford Leaheey
*Attorney, Agent, or Firm*—Cennamo, Kremblas & Foster

[57] ABSTRACT

An acoustic coupler with equalized attenuation over the entire voice range. The coupler contains a microphone and has a sound muffling cup for snugly receiving the speaker end of a telephone handset. A plurality of series connected, independently, mechanically tenable, op-amp filters connect the microphone to a signal receiving circuit. The filters are tuned to selected center frequencies to equalize the frequency response between the input of the telephone speaker and the input of the signal receiving circuit.

4 Claims, 4 Drawing Figures

ATTENUATION EQUALIZING ACOUSTIC COUPLER

BACKGROUND

This invention relates generally to acoustic couplers of a type usually associated with data communication over telephone lines and more particularly relates to an acoustic coupler suitable for both data and voice communication.

Data couplers conventionally have two resilient muffling cups for receiving the opposite ends of a telephone handset. In one cup, a speaker is positioned to acoustically transmit signals from the coupler to the microphone end of the handset. A microphone is positioned in the other muffling cup to receive signals transmitted from the speaker of the telephone handset.

Data communication ordinarily is accomplished by frequency shift modulation near a frequency of 1KHz or 2KHz for example. Consequently, in acoustic couplers, there has not been a need to be concerned with the frequency response of the coupler over the entire voice range because such a small interval of the voice range was utilized. If voice communications were needed, the handset was merely lifted from the coupler and used in the conventional manner. This, of course, eliminated the acoustic coupler from use with voice communications.

There is, however, now a need for an acoustic coupler which is capable of coupling either data or voice transmissions from a transmission line to an appropriate signal processing circuit.

SUMMARY OF THE INVENTION

The invention is an attenuation equalizing acoustic coupler for coupling acoustic voice and data signals from the speaker of a telephone handset to an audio signal receiving circuit such as a modem in the case of data communication or an amplifier in the case of voice communication. The coupler has a sound muffling cup for snugly receiving a speaker end of the handset and has a microphone transducer at the cup for receiving acoustic signals from the speaker. A plurality of series connected, independently tunable, active filters have their input connected to the transducer and their output connected to the signal receiving circuit. The filters are tuned to selected center frequencies in the voice range for equalizing the frequency response between the input of the speaker and the input of the signal receiving circuit.

It is therefore an object of the invention to provide an improved acoustic coupler.

Another object of the invention is to provide an acoustic coupler which may operate not only for the transmission of acoustic data signals, but additionally may operate for the transmission of voice signals.

Another object of the invention is to equalize the entire transfer characteristics from the input of the telephone handset speaker to the input of the audio signal receiving circuit.

Further objects and features of the invention will be apparent from the following specification and claims when considered in connection with the accompanying drawings illustrating several embodiments of the invention.

Figure 1:
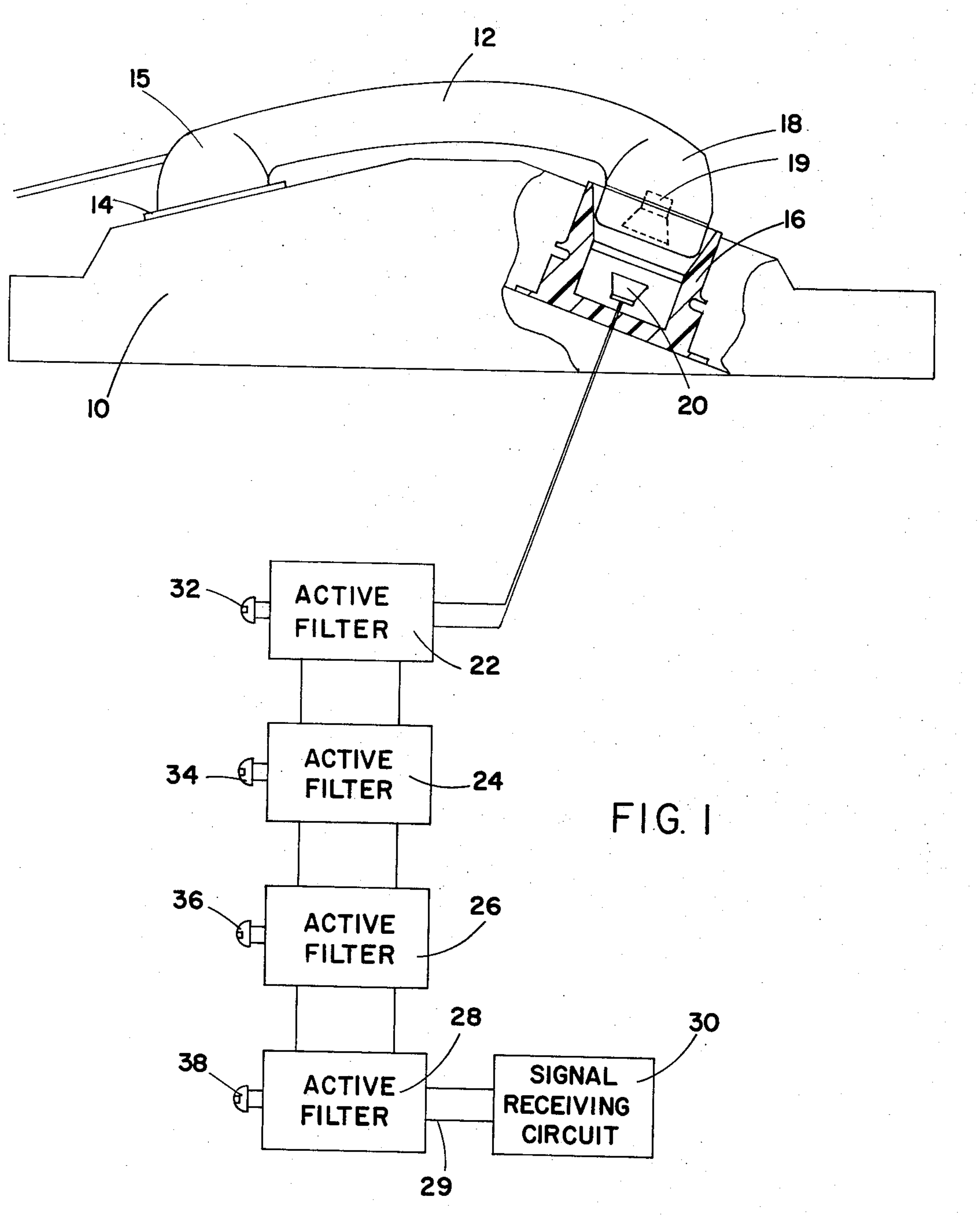
FIG. 1 is a block diagram illustrating the preferred embodiment of the invention.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose. For example, the term connection is used and includes connection through additional circuit elements where equivalent operation results.

DETAILED DESCRIPTION OF THE DRAWINGS

FIG. 1 illustrates an acoustic coupler 10 on which a telephone handset 12 is positioned. The acoustic coupler 10 has a first muffling cup 14 for receiving the microphone end 15 of the handset and a second muffling cup 16 for snugly receiving the speaker end 18 of the telephone handset. A microphone transducer 20 is mounted in the cup for receiving acoustic signals from the telephone speaker 19. The output of the microphone 20 is connected to the input of a plurality of series connected independently tunable active filters 22, 24, 26 and 28. The output of these series connected filters 22–28 are connected to an audio signal receiving circuit 30. The audio signal receiving circuit 30 may include a switching or controlling circuit for applying the appropriate signal to a modem in the case of data signals or to a suitable amplifier in the case of voice transmissions. Each of the filters 22–28 are independently, mechanically tunable by tuning screws 32–38.

Figure 2:
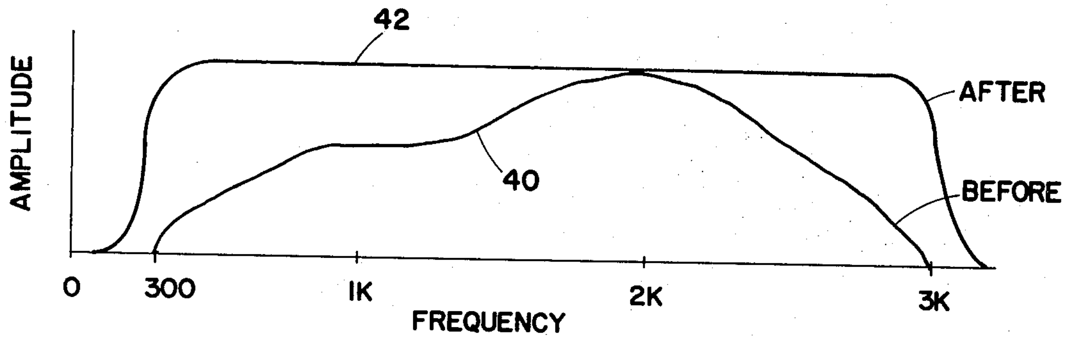
FIG. 2 is a graphical illustration of the transfer characteristics of both an unequalized coupler and a coupler equalized according to the present invention.

FIG. 2 illustrates at curve 40 the amplitude transfer characteristic between the input of the telephone handset speaker 19 and the output 29 of the series connected filter 22–28.

Figure 3:
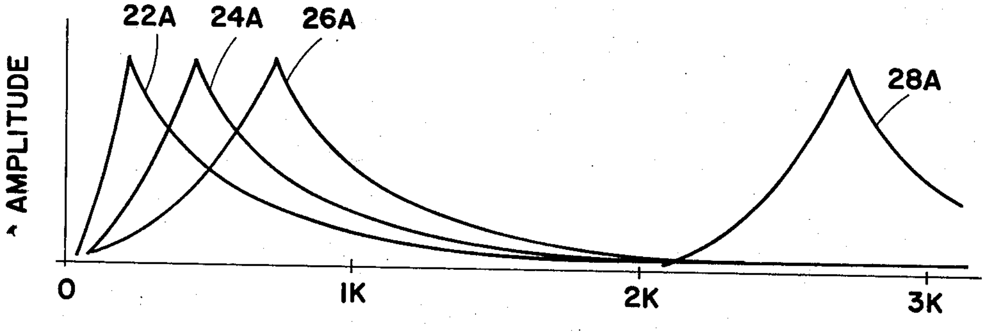
FIG. 3 is a graphical representation of four exemplary frequency response characteristics for the four filter stages illustrated in FIG. 1.

FIG. 3 illustrates the frequency response or transfer characteristic of the individual filters 22–28. For example, the curve 22A corresponds to the frequency response of the filter 22.

By appropriately tuning the filters 22–28 to center frequencies near opposite ends of the voice range where the unequalized characteristic falls off, the overall frequency response may be made to be that illustrated at curve 42 in FIG. 2. This may most easily and efficiently be accomplished by applying a sweep frequency generator at the input of the telephone handset speaker 19 and observing the output of the series filters 22–28 on an oscilloscope. The separate filters are then manually tuned until a response characteristic is accomplished which most nearly approaches a rectangular pass band characteristic.

Figure 4:
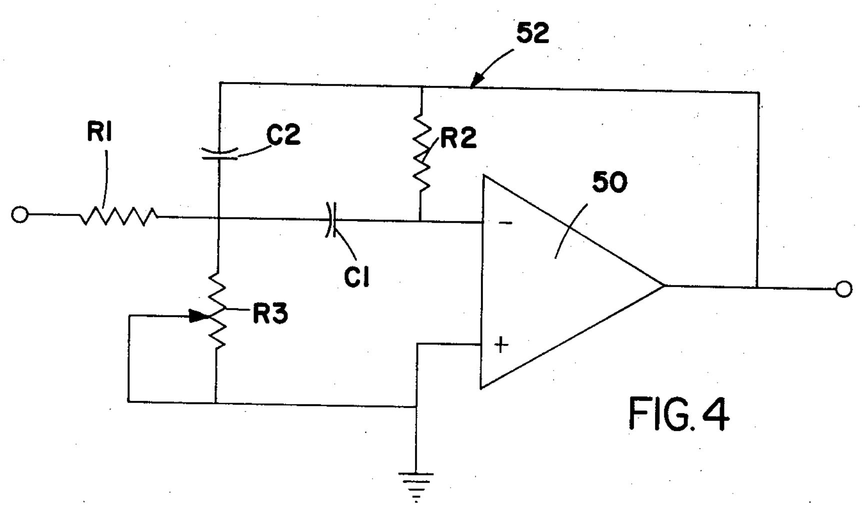
FIG. 4 is a schematic diagram of an active, op-amp filter suitable for use in the present invention.

FIG. 4 illustrates a suitable band pass filter having an operational amplifier 50 and a suitable feedback network means indicated generally as 52. The feedback network means 52, which gives the filter characteristic, includes $R_1$, $R_2$, $R_3$, $C_1$ and $C_2$ with $C_1$ equal to $C_2$. In this circuit the center frequency may be found according to the following formula:

$$F = \frac{1}{2C\pi\sqrt{\frac{R_1 + R_3}{R_1R_2R_3}}}$$

If the resistor $R_1$ is made much greater than the resistance $R_3$, then the filter frequency is approximately inversely proportional to the square root of $R_3$. Consequently, as illustrated in FIG. 4, $R_3$ may be made variable and adjustable by the set screws 32, 34, 36 or 38 on each filter.

Therefore, it can be seen that I have equalized the characteristic for the entire combination of the telephone speaker, the muffler cup and microphone. By doing so, with a plurality of independently tunable active filters, I have provided an acoustic coupler which is operable over the entirety of the voice range for both voice transmissions and data transmissions.

It is to be understood that while the detailed drawings and specific examples given describe preferred embodiments of the invention, they are for purposes of illustration only; the apparatus of the invention is not limited to the precise details and conditions disclosed and that various changes may be made therein without departing from the spirit of the invention which is defined by the following claims.

What is claimed is:

1. At attenuation equalizing acoustic coupler for coupling acoustic voice and data signals from the speaker of a telephone handset to an audio signal receiving circuit, the coupler comprising:

a. a sound muffling cup for snugly receiving the speaker end of said handset;

b. a microphone transducer mounted within said cup for receiving acoustic signals from said speaker; and c. a plurality of series connected, independently tunable, active filters having their input connected to said transducer and their output connected to said signal receiving circuit, said filters being tuned to selected center frequencies in the voice range for equalizing the frequency response between the input of said speaker and the input of said signal receiving circuit.

2. A coupler according to claim 1 wherein said filters are tuned to spaced center frequencies near opposite ends of the voice range.

3. A coupler according to claim 1 wherein each of said filters comprises an operational amplifier and a suitable feedback network means for forming an active filter, said feedback network including a resistive element determinative of the center frequency of said filter.

4. A coupler according to claim 3 wherein said resistance is mechanically variable for tuning said filters.

* * * * *